United States Patent [19]

Greenaway

[11] 4,250,217
[45] Feb. 10, 1981

[54] DOCUMENTS EMBOSSED WITH MACHINE-READABLE INFORMATION BY MEANS OF AN EMBOSSING FOIL

[75] Inventor: David L. Greenaway, Birchwil, Switzerland

[73] Assignee: LGZ Landis & Gyr Zug AG, Zug, Switzerland

[21] Appl. No.: 737,217

[22] Filed: Nov. 1, 1976

[30] Foreign Application Priority Data

Nov. 17, 1975 [CH] Switzerland ............... 14847/75

[51] Int. Cl.³ .................. B32B 3/28; B32B 27/10
[52] U.S. Cl. .................. 428/161; 101/32; 156/221; 156/230; 350/168; 428/172; 428/179; 428/916; 427/162; 427/276
[58] Field of Search ............ 428/156, 161, 173, 174, 428/915, 916, 172, 179; 40/1.5; 283/78 R, 8 B, 9 R; 427/276, 288, 162; 206/807; 350/168; 156/219, 221, 230; 101/3 R, 32; 264/320 R; 96/27 H

[56] References Cited

U.S. PATENT DOCUMENTS

| | | | |
|---|---|---|---|
| 1,996,539 | 4/1935 | Dufay | 101/32 |
| 2,205,466 | 6/1940 | Caprio et al. | 156/219 |
| 3,497,576 | 2/1970 | Dvorin | 264/320 |
| 3,594,245 | 7/1971 | Hayes | 156/219 |
| 3,930,924 | 1/1976 | Oka et al. | 283/7 |
| 4,033,059 | 7/1977 | Hutton et al. | 428/916 |

*Primary Examiner*—Paul J. Thibodeau

[57] ABSTRACT

There is described a process for embossing onto a document machine-readable information in the form of optical markings with a light-modifying relief structure for indicating the genuineness of the document, comprising transferring a thermoplastic layer to the document from an embossing foil by means of a hot embossing die, and simultaneously embossing the optical markings in at least the thermoplastic layer. Also described are embossed documents produced by the disclosed process.

5 Claims, 4 Drawing Figures

DOCUMENTS EMBOSSED WITH MACHINE-READABLE INFORMATION BY MEANS OF AN EMBOSSING FOIL

BACKGROUND AND BRIEF DESCRIPTION OF THE INVENTION

This invention relates to processes for embossing machine-readable information onto a document. The information may be for indicating the genuineness of the document. The invention also relates to documents so embossed.

Documents such as indentity cards, credentials, tickets, securities and the like have become an indispensable aid to everyday life. The monetary or legal value of such documents is often considerable, which induces the criminal elements of society to forge, change or copy such documents.

In the industrialized countries, machines are being increasingly used to test the genuineness or identity of documents. Examples are devices for checking securities, credit card reading devices and admission or travel ticket acceptance devices. If the genuineness or identity features of documents to be checked by machines are made too simple, this again constitutes an inducement to fraudulent dealings.

Identity cards are known which are protected against forgery by a refracting shape being stamped into a plastic support member. Furthermore, it has already been proposed to emboss machine-readable information indicating genuineness in the form of optical markings onto a plastic means of payment, which markings have a light-modifying relief structure and can be holograms, kinoforms, miniature Fresnel prisms and the like.

The problem of the present invention is to provide a process of the type indicated hereinbefore by means of which very fine optical markings can be applied to documents which are made from a material which, due to its fibrous, granular or cellular structure, is in itself unsuitable for receiving the desired characteristic relief structure.

According to the present invention there is provided a process for embossing machine-readable information for indicating genuineness onto a document, in the form of optical markings with a light-modifying relief structure, wherein a thermoplastic layer is transferred to the document from an embossing foil by a hot embossing die and simultaneously the optical markings are embossed both in the thermoplastic layer and in the document.

BRIEF DESCRIPTION OF THE DRAWINGS

The invention will now be described by way of example with reference to the accompanying drawing, in which.

DETAILED DESCRIPTION OF THE INVENTION

Figure 1:
FIG. 1 shows an embossing foil.

FIG. 1 shows a so-called hot embossing foil 1, which is used in printing works to print texts with relatively large area characters, ornamental work and the like. The foil 1 comprises a substrate 2 made from polyester or some other plastic with a relatively high melting point and a thermoplastic layer 3 with a lower melting point, which is applied to the substrate 2. When pressure and heat are applied, the thermoplastic layer 3 can form an intimate bond with many materials. The adhesion between the substrate 2 and the thermoplastic layer 3 is slight, so that during the embossing process, the thermoplastic layer 3 is detached from the substrate 2 and is transferred to the surface to be printed. The thermoplastic layer 3 can be colored or metallized, so that surface effects of very varied types are obtainable.

Figure 2:
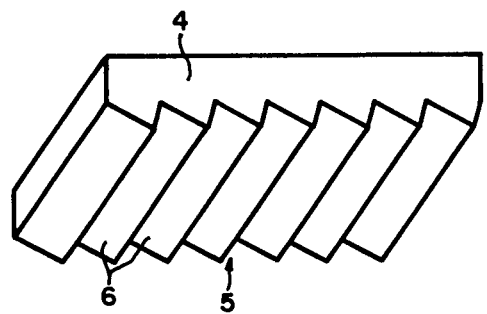
FIG. 2 shows a portion of an embossing die.

Using foil 1 and an embossing die, machine-readable information indicating genuineness can be incorporated into a document in the form of optical markings with a light-modifying relief structure. FIG. 2 shows a greatly enlarged portion of such an embossing die 4, whose hard metal embossing surface 5 carries a negative of the relief structure to be embossed. In the representative example, the embossing surface 5 comprises prismatic facets 6 having a sawtooth cross-section and smooth face.

Figure 3:
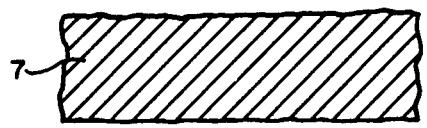
FIG. 3 shows an unembossed document in cross-section.

The die 4 is incorporated into a hot process embossing press (not shown), and in the latter is heated to a temperature which is determined by the temperature characteristics of the foil 1. The foil 1 is placed between a document 7 to be embossed (FIG. 3) and the embossing surface 5 of the die 4. The die 4 is pressed with a suitable pressure onto the document 7, whereby the thermoplastic layer 3 is transferred to the surface of the document 7 and is detached from the substrate 2. At the same time, the optical markings are pressed into the thermoplastic layer 3 and into the document 7 adhering thereto.

Figure 4:
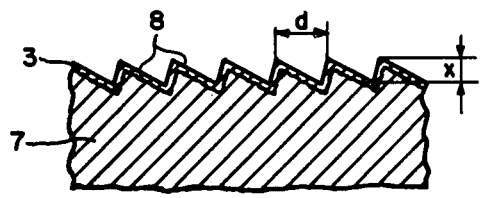
FIG. 4 shows an embossed document in cross-section.

FIG. 4 shows document 7 with optical markings 8 embossed thereon in the manner described. It can be seen that the thermoplastic layer 3 transferred to the document 7 adapts closely to the relief structure embossed on the document 7, but compensates for surface roughness thereof, so that the individual facets have an extremely smooth surface corresponding to the die 4 used.

Thus optical markings 8 can be incorporated in a document 7 which, due to its fibrous, granular or cellular structure is not in itself suitable to receive the embossed optical markings 8 with the necessary fineness and surface smoothness of the individual projections and depressions. Thus, the process is primarily suited for the embossing of very fine characteristic relief structures onto paper or cardboard documents.

The information indicating genuineness incorporated into document 7 by means of the optical markings 8 can be read in suitable reading devices by means of at least one light source and a light sensor. The relief structure modifies an incident reading light beam in a manner which is characteristic of the particular relief structure. The facet structure shown in exemplified manner leads to a characteristic specular reflection of the incident light on the embossed facets, which significantly differs from the reflection or dispersion of unembossed areas of the document 7.

The line spacing d of the optical markings 8 is preferably smaller than 0.1 mm. Such fine markings make considerable demands on the manufacturing precision of the die 4 and can therefore only be forged with an extremely large technical expenditure.

If the thickness of the thermoplastic layer 3 is made the same or smaller than the profile depth x of the optical markings 8, a particularly characteristic light-modifying relief structure is obtained, without modifying the character of the document 7 per se. This measure also avoids any damage, during the embossing process, to any thin reflective or colored coating applied to the thermoplastic layer 3. Using a commercially available foil 1, whose substrate 2 has a thickness of about 0.01 mm., it is possible without difficulty to emboss a very fine relief structure with a line spacing of only 0.03 mm. onto a paper or cardboard document.

In the case of documents whose thickness is greater than the profile depth x, the document is placed on a flat base during the embossing process. In the case of thinner documents, a shaped base adapted to the die 4 may be necessary.

Preferably the optical markings 8 are of such a type that they modify by reflection or refraction light projected onto the relief structure.

The optical markings 8 can be provided with further characteristic features by means of suitable measures. The thermoplastic layer 3 is preferably coated with a thin reflective coating, which can be brought about by using a corresponding embossing foil or by a coating process which follows the embossing process. Furthermore, both the thermoplastic layer 3 and the area of the document 7 located under the latter can be colored or printed with an ink in order to obtain a spectral reflection of the incident reading light beam at the optical markings 8, and in order to prevent any undesired dispersion of the reading light at the surface of the document 7 located behind the thermoplastic layer 3.

I claim:

1. A document including a machine-readable relief structure in at least a portion of the surface area, comprising:
    a document of paper or cardboard;
    a thermoplastic layer transferred to the document from an embossing foil by means of a hot embossing die,
        said thermoplastic layer having a thickness less than the profile depth of the relief structure;
    a relief structure providing optical markings having a light specular reflecting and refracting properties with line spacings less than 0.1 mm being embossed into the document by said hot embossing die
    said thermoplastic layer covering the embossed surface of said document and adapting closely to the relief structure embossed in the document.
    to compensate for surface roughness of said document and
    to provide light-modifying optical markings having a relatively smooth surface corresponding to the embossing surface of said embossing die.

2. The document according to claim 1 wherein said relief structure comprises discrete prismatic facets having a sawtooth cross-section.

3. An embossed document according to claim 1, further comprising a reflective coating coated on said thermoplastic layer.

4. A process for introducing onto a document of paper or cardboard machine-readable information in the form of optical markings having a light-modifying relief structure providing optical markings having a light specular reflecting and refracting structure possessing discrete prismatic facets having a sawtooth cross-section, comprising transferring a thermoplastic layer having a thickness equal to or less than the profile depth of said relief structure, said layer being coated with a reflective coating, to the document from an embossing foil by pressing a hot embossing die, whose embossing surface carries a negative of said relief structure, onto the embossing foil and the document, and simultaneously embossing the optical markings in both the coated thermoplastic layer and in the document in such a way that the coated thermoplastic layer homogeneously covers the surface of the document and adapts closely to the relief structure embossed into the document, but compensates for surface roughness thereof, so that the individual optical markings have a smooth surface corresponding to the embossing die.

5. A process for forming a light specular reflecting and refracting relief structure on a document of paper or cardboard, comprising:
    overlying the document with a thermoplastic embossing foil layer having a thickness less than the profile depth of the intended relief structure
    pressing a hot embossing die onto the embossing foil and the document,
        said embossing die having an embossing surface which carries the negative of the relief structure with line spacings less than 0.1 mm, and
    simultaneously embossing the light-modifying relief structure into both the thermoplastic layer and the document in such a way that the thermoplastic layer,
    homogeneously covers the surface of the document in the relief area and adapts closely to the relief structure embossed into the document, and compensates for surface roughness of the document so that individual optical markings in the relief structure have relatively smooth surface corresponding to the embossing die.

* * * * *